United States Patent
Thiyagarajan et al.

(10) Patent No.: US 12,528,936 B2
(45) Date of Patent: Jan. 20, 2026

(54) POLYMER COMPOSITIONS AND PRODUCTS FORMED THEREWITH

(71) Applicant: Church & Dwight Co., Inc., Princeton, NJ (US)

(72) Inventors: Muthiah Thiyagarajan, Flemington, NJ (US); Carmen Guzman, Ewing, NJ (US); Jon Toliver, Franklin Park, NJ (US); John Ip, Princeton, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 1258 days.

(21) Appl. No.: 17/125,400

(22) Filed: Dec. 17, 2020

(65) Prior Publication Data

US 2021/0189106 A1   Jun. 24, 2021

Related U.S. Application Data

(60) Provisional application No. 63/094,175, filed on Oct. 20, 2020, provisional application No. 62/951,870, filed on Dec. 20, 2019.

(51) Int. Cl.
*C08L 9/08* (2006.01)
*A61B 42/10* (2016.01)
*A61F 6/04* (2006.01)
*C08L 7/02* (2006.01)

(52) U.S. Cl.
CPC ........ *C08L 9/08* (2013.01); *A61F 6/04* (2013.01); *C08L 7/02* (2013.01); *A61B 42/10* (2016.02)

(58) Field of Classification Search
None
See application file for complete search history.

(56) References Cited

U.S. PATENT DOCUMENTS

| | | | |
|---|---|---|---|
| 3,215,649 A | 11/1965 | Preiss et al. |
| 3,238,173 A | 3/1966 | Bailey et al. |
| 3,261,792 A | 7/1966 | Halper et al. |
| 3,360,599 A | 12/1967 | Nyberg et al. |
| 3,988,275 A | 10/1976 | Satake et al. |
| 5,082,732 A | 1/1992 | Ueda et al. |
| 5,444,121 A | 8/1995 | Grennes et al. |

(Continued)

FOREIGN PATENT DOCUMENTS

| | | |
|---|---|---|
| CA | 2716805 | 11/2017 |
| CN | 103921352 | 7/2014 |

(Continued)

OTHER PUBLICATIONS

Hanus, et al., "Electrolyte-Induced Aggregation of Acrylic Latex. 1. Dilute Particle Concentrations", Center for Molecular and Engineering Thermodynamics, Department of Chemical Engineering, University of Delaware, Newark, DE, Publication: Langmuir 2001, vol. 17, No. 11, pp. 3136-3147. US.

(Continued)

*Primary Examiner* — Satya B Sastri
(74) *Attorney, Agent, or Firm* — Church & Dwight Co., Inc.

(57) ABSTRACT

The present disclosure provides compositions and products formed therefrom. In particular, the disclosure provides elastomeric latex articles, such as gloves and condoms, that can exhibit a desired combination of properties that can be correlated to suitable strength and softness.

10 Claims, 1 Drawing Sheet

(56) References Cited

U.S. PATENT DOCUMENTS

| | | | |
|---|---|---|---|
| 5,500,469 A | 3/1996 | Johnsen et al. | |
| 5,513,654 A | 5/1996 | Delson | |
| 5,728,340 A | 3/1998 | Dreibelbis et al. | |
| 5,744,540 A | 4/1998 | Baumstark et al. | |
| 5,851,683 A | 12/1998 | Plamthottam et al. | |
| 6,021,524 A | 2/2000 | Wu et al. | |
| 6,121,366 A * | 9/2000 | Sharma | A61L 31/048 |
| | | | 524/505 |
| 6,492,446 B1 | 12/2002 | Kajiwara et al. | |
| 6,559,255 B2 | 5/2003 | Klaerner et al. | |
| 6,579,937 B1 | 6/2003 | Guentherberg et al. | |
| 6,579,940 B1 | 6/2003 | Dove | |
| 6,828,387 B2 | 12/2004 | Wang et al. | |
| 6,833,276 B2 | 12/2004 | Klaerner et al. | |
| 6,867,254 B2 | 3/2005 | Wiercinski et al. | |
| 6,914,091 B2 | 7/2005 | Donald et al. | |
| 6,920,643 B2 | 7/2005 | McGlothlin et al. | |
| 6,998,158 B2 | 2/2006 | Hoerner et al. | |
| 7,041,367 B2 | 5/2006 | Janssen et al. | |
| 7,048,979 B2 | 5/2006 | Wright et al. | |
| 7,179,849 B2 | 2/2007 | Terry | |
| 7,265,192 B2 | 9/2007 | Soerens | |
| 7,329,442 B2 | 2/2008 | Modha et al. | |
| 7,344,568 B2 | 3/2008 | Chen | |
| 7,374,711 B2 | 5/2008 | McGlothlin et al. | |
| 7,531,594 B2 | 5/2009 | Lin et al. | |
| 7,582,702 B2 | 9/2009 | Wright et al. | |
| 7,585,916 B2 | 9/2009 | Wright et al. | |
| 7,662,890 B2 | 2/2010 | Aida et al. | |
| 7,700,705 B2 | 4/2010 | Van Jole | |
| 8,003,209 B2 | 8/2011 | Flood et al. | |
| 8,087,412 B2 * | 1/2012 | Lucas | C08L 23/20 |
| | | | 128/842 |
| 8,104,097 B2 | 1/2012 | Hamann | |
| 8,117,672 B2 | 2/2012 | Lipinski | |
| 8,273,810 B2 | 9/2012 | Wang et al. | |
| 8,399,105 B2 | 3/2013 | Butz et al. | |
| 8,431,667 B2 | 4/2013 | Cornish et al. | |
| 8,436,087 B2 | 5/2013 | Foo | |
| 8,492,480 B2 | 7/2013 | Takeshi et al. | |
| 8,530,016 B2 | 9/2013 | Wang et al. | |
| 8,546,506 B2 | 10/2013 | Mcauliffe et al. | |
| 8,633,268 B2 | 1/2014 | Lawson et al. | |
| 8,651,110 B2 | 2/2014 | Hui | |
| 8,673,172 B2 | 3/2014 | Van Jole | |
| 8,680,191 B2 | 3/2014 | Foo | |
| 8,829,083 B2 | 9/2014 | Lundgard et al. | |
| 8,835,014 B2 | 9/2014 | Wang et al. | |
| 9,000,090 B2 | 4/2015 | Attrill et al. | |
| 9,074,027 B2 | 7/2015 | Lucas et al. | |
| 9,074,029 B2 | 7/2015 | Lucas et al. | |
| 9,085,100 B2 | 7/2015 | Foo | |
| 9,296,850 B2 | 3/2016 | Feher et al. | |
| 9,321,932 B2 | 4/2016 | De Jong | |
| 9,527,226 B2 | 12/2016 | Foo | |
| 9,694,519 B2 | 7/2017 | Foo | |
| 9,758,648 B2 | 9/2017 | Van Der Waal et al. | |
| 9,932,463 B2 | 4/2018 | Van Der Waal et al. | |
| 9,951,160 B2 | 4/2018 | Huizen et al. | |
| 9,994,694 B2 | 6/2018 | De Jong et al. | |
| 10,047,212 B2 | 8/2018 | Van Der Waal et al. | |
| 10,066,100 B2 | 9/2018 | Greger | |
| 10,125,239 B2 | 11/2018 | Chen et al. | |
| 10,214,621 B2 | 2/2019 | Potter et al. | |
| 10,385,156 B2 | 8/2019 | Zhou et al. | |
| 10,456,290 B2 | 10/2019 | Oleson et al. | |
| 10,517,338 B2 | 12/2019 | Chen et al. | |
| 10,538,609 B2 | 1/2020 | Lucas et al. | |
| 11,958,969 B2 * | 4/2024 | Kodemura | B29C 41/14 |
| 2002/0061981 A1 | 5/2002 | Donald et al. | |
| 2002/0061982 A1 | 5/2002 | Donald et al. | |
| 2003/0161975 A1 | 8/2003 | Lucas et al. | |
| 2003/0175458 A1 | 9/2003 | Jain et al. | |
| 2004/0071909 A1 | 4/2004 | McGlothlin et al. | |
| 2004/0105943 A1 | 6/2004 | Hoerner et al. | |
| 2004/0147661 A1 | 7/2004 | Yaakub et al. | |
| 2006/0173137 A1 | 8/2006 | McGlothlin et al. | |
| 2009/0272384 A1 * | 11/2009 | Lucas | C08L 9/00 |
| | | | 427/2.3 |
| 2010/0204397 A1 | 8/2010 | Kobayashi et al. | |
| 2011/0178234 A1 | 7/2011 | Wang et al. | |
| 2014/0142211 A1 | 5/2014 | Stoever et al. | |
| 2014/0171540 A1 * | 6/2014 | De Jong | C08F 297/046 |
| | | | 523/105 |
| 2015/0087761 A1 | 3/2015 | Satoh et al. | |
| 2015/0128329 A1 | 5/2015 | Amarasekera et al. | |
| 2015/0272245 A1 | 10/2015 | Khor et al. | |
| 2016/0040033 A1 | 2/2016 | Harrison et al. | |
| 2016/0108154 A1 * | 4/2016 | Krutzer | C08K 5/0025 |
| | | | 526/192 |
| 2017/0107403 A1 | 4/2017 | Woo et al. | |
| 2017/0274566 A1 | 9/2017 | Foo | |
| 2017/0333602 A1 | 11/2017 | Amiralian et al. | |
| 2018/0193237 A1 | 7/2018 | Foo et al. | |
| 2018/0346754 A1 | 12/2018 | Macdonald | |
| 2019/0010271 A1 | 1/2019 | Kodemura et al. | |
| 2019/0023854 A1 | 1/2019 | Ishii et al. | |
| 2019/0031788 A1 | 1/2019 | Kodemura et al. | |
| 2019/0031861 A1 | 1/2019 | Satoh et al. | |
| 2019/0031865 A1 | 1/2019 | Ishii et al. | |
| 2019/0055367 A1 | 2/2019 | Shiba et al. | |
| 2019/0177496 A1 | 6/2019 | Chen et al. | |
| 2019/0218375 A1 | 7/2019 | Lucas et al. | |
| 2019/0270863 A1 | 9/2019 | Leng et al. | |
| 2019/0292331 A1 | 9/2019 | Wang et al. | |
| 2019/0292361 A1 | 9/2019 | Flood et al. | |
| 2019/0300685 A1 | 10/2019 | Ishiba et al. | |
| 2019/0321214 A1 | 10/2019 | Wang | |
| 2019/0367687 A1 | 12/2019 | Kodemura et al. | |
| 2020/0010651 A1 | 1/2020 | Aihara et al. | |
| 2020/0062873 A1 | 2/2020 | Kodemura et al. | |
| 2020/0199311 A1 | 6/2020 | Foo et al. | |
| 2021/0032422 A1 * | 2/2021 | Lam | C08J 3/26 |
| 2021/0189106 A1 | 6/2021 | Thiyagarajan et al. | |

FOREIGN PATENT DOCUMENTS

| | | | |
|---|---|---|---|
| CN | 103921382 | 7/2014 | |
| EP | 2799483 | 11/2014 | |
| EP | 3155019 | 1/2018 | |
| GB | 1028357 | 5/1966 | |
| GB | 2436566 | 10/2007 | |
| JP | 2016141691 | 8/2016 | |
| NL | 2011591 | 4/2015 | |
| WO | WO 95/00586 A1 | 1/1995 | |
| WO | 200322891 | 3/2003 | |
| WO | 2006027164 | 3/2006 | |
| WO | 2011157033 | 12/2011 | |
| WO | WO 2016/061043 | 4/2016 | |
| WO | 2018117812 | 6/2018 | |
| WO | 2018194904 | 10/2018 | |
| WO | 2018207683 | 11/2018 | |
| WO | 2018224881 | 12/2018 | |
| WO | WO 2019/003744 | 1/2019 | |
| WO | 2019039523 | 2/2019 | |
| WO | 2019073890 | 4/2019 | |
| WO | 2019171981 | 9/2019 | |
| WO | WO 2019/183302 | 9/2019 | |
| WO | 2019197520 | 10/2019 | |
| WO | 2019216241 | 11/2019 | |
| WO | 2019218088 | 11/2019 | |
| WO | WO-2020045102 A1 * | 3/2020 | B29C 41/003 |
| WO | WO 2019/003744 A1 | 4/2020 | |
| WO | WO 2020/131267 A1 | 6/2020 | |
| WO | WO 2021/124215 A2 | 6/2021 | |

OTHER PUBLICATIONS

Mayer, et al., "Emulsion Polymerization of Styrene with Disproportionated Rosin Acid Soap as Emulsifier", Journal of Applied Polymer Science, vol. 59, 1047 (1996) US.

Vera, et al., "Colloidal Stability of a Pharmaceutical Latex: Experi- (56) References Cited

OTHER PUBLICATIONS mental Determinations and Theoretical Predictions", Journal of Colloid and Interface Science, vol. 117, pp. 553-560 (1996), Article No. 0069. ES.

* cited by examiner

POLYMER COMPOSITIONS AND PRODUCTS FORMED THEREWITH

CROSS-REFERENCE TO RELATED APPLICATIONS

The present application claims priority to U.S. Provisional Pat. App. No. 63/094,175, filed Oct. 20, 2020, and U.S. Provisional Pat. App. No. 62/951,870, filed Dec. 20, 2020, the disclosures of which are incorporated herein by reference in their entireties.

FIELD OF THE DISCLOSURE

The present disclosure relates to polymer compositions and products that are formed from the polymer compositions, such as elastomeric articles, and particularly thin-walled products, such as gloves and condoms. The present disclosure further relates to methods of making such products.

BACKGROUND

Natural rubber, which is comprised primarily of cis-1,4-polyisoprene, is well known for use in making thin-film, elastomeric articles, such as surgical gloves, balloons, condoms, and the like. However, articles formed from natural rubber latex are associated with a number of health problems, such as allergic reactions. As a result, some have turned to synthetic polyisoprene as a replacement for natural rubber in such articles. Because of the desire to achieve articles with excellent tensile properties, however, polyisoprene articles have typically been vulcanized similarly to natural rubbers using sulfur-based curing agents and zinc oxide cure activators. While avoiding some of the problems associated with the use of natural rubber, replacement with synthetic polymer latex does not necessarily lead to articles that exhibit necessary physical properties for useful articles. Accordingly, there remains a need in the field for compositions and articles formed therefrom that are thin-film forming materials and that can provide articles with the desired properties.

SUMMARY OF THE DISCLOSURE

The present disclosure provides compositions of polymeric materials and articles made therefrom. The articles may include any material that is useful when provided in the form of an elastomeric, thin film to provide a combination of desirably high tensile strength and low modulus. In certain embodiments, the articles particularly may include condoms and/or gloves. The present disclosure further provides methods of preparing polymeric compositions and articles.

In one or more embodiments, the present disclosure thus may provide elastomeric articles comprising one or more layers of a natural rubber latex, a synthetic latex, or a combination thereof, wherein the elastomeric article is adapted to or configured to exhibit a variety of properties indicative of articles that provide high strength (and thus valuable protective properties consistent with their intended uses) and also good softness and similar properties associated with good comfort, which can be valuable for improving consistent use of the articles.

In example embodiments, an elastomeric article according to the present disclosure can comprise one or more layers of a polymer composition formed from one or both of a natural rubber latex and a synthetic rubber latex, wherein the elastomeric article at a thickness of about 0.1 mm or less exhibits a tensile strength of greater than 30 MPa when measured in accordance with ASTM D412, exhibits a tear strength of greater than 2 N/mm where measured in accordance with ASTM D412 or ASTM D624, exhibits a tensile modulus at 500% elongation of about 1.1 MPa to about 2.25 MPa when measured in accordance with ASTM D412, and exhibits an elongation at break of about 1,100% or greater. In further embodiments, the elastomeric article may be defined in relation to one or more of the following statements, which can be combined in any number and order.

The elastomeric article can be a condom.

The polymer composition can comprise polyisoprene as the synthetic rubber latex.

The polymer composition can comprise poly(styrene-isoprene-styrene) as the synthetic rubber latex.

The polymer composition can comprise styrene ethylene butylene styrene as the synthetic rubber latex.

The polymer composition can comprise water-based polyurethane as the synthetic rubber latex.

The polymer composition can comprise nitrile rubber as the synthetic rubber latex.

The polymer composition further can comprise a dithiocarbamates.

The polymer composition further can comprise a thiuram.

The polymer composition further can comprise one or more of a surfactant, an antioxidant, a rheological stabilizer, a filler, and a smoothing agent.

The polymer composition can comprise at least one surfactant having an HLB value of about 7 to about 24.

The polymer composition can be substantially free of elemental sulfur or free sulfur.

The polymer composition can be substantially free of zinc oxide.

The polymer composition can be substantially free of diphenyl guanidine.

The elastomeric article can exhibit a Young's modulus (E') that is less than 1 MPa at a frequency of 1 Hz and that is greater than 1 MPa at a frequency of 21.5 Hz.

In some embodiments, the present disclosure further can relate to methods for preparing an elastomeric article. In an example, a method for preparing an elastomeric article can comprise: preparing a compounded latex composition including a synthetic rubber latex polymer, at least one sulfur donor, and at least one dithiocarbamate accelerator; prevulcanizing the compounded latex composition to form a prevulcanized compounded latex composition; dipping a former into the prevulcanized compounded latex composition to form at least one layer of the prevulcanized compounded latex composition thereon; and curing the at least one layer of the prevulcanized compounded latex composition on the former to provide the elastomeric article. In further embodiments, such method can be further defined in relation to one or more of the following statements, which can be combined in any number and order.

The at least one sulfur donor can be a thiuram compound.

The at least one sulfur donor can include one or both of dipentamethylenethiuram tetrasulfide (DPTT) and dipentamethylenethiuram hexasulfide (DPTTH).

The compounded latex composition further can include at least one amphoteric surfactant.

The compounded latex composition further can include at least one antioxidant.

The method can comprise prevulcanizing the compounded latex composition in a temperature range of about 25° C. to about 40° C. for a time of about 12 hours to about 48 hours.

The method can comprise prevulcanizing the compounded latex composition until achieving a relaxed modulus of about 0.50 to about 0.61.

In further embodiments, the present disclosure can relate to articles, products, or the like that are prepared according to methods or processes as described herein. The articles or products can be defined in relation to one or more of the following statements, which can be combined in any number and order.

The elastomeric article can be a condom.

The elastomeric article can be a glove

The elastomeric, at a thickness of about 0.1 mm or less, can exhibit a tensile strength of greater than 30 MPa when measured in accordance with ASTM D412, can exhibit a tear strength of greater than 2 N/mm where measured in accordance with ASTM D412 or ASTM D624, can exhibit a tensile modulus at 500% elongation of about 1.1 MPa to about 2.25 MPa when measured in accordance with ASTM D412, and can exhibit an elongation at break of about 1,100% or greater, such properties and values being present individually or in any combination. Moreover, such articles can exhibit a Young's modulus (E') that is less than 1 MPa at a frequency of 1 Hz and that is greater than 1 MPa at a frequency of 21.5 Hz.

DETAILED DESCRIPTION OF THE DISCLOSURE

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to polymer compositions and articles formed at least partially from such compositions. The polymer compositions can be adapted or configured to provide articles formed therefrom with a combination of properties and that can impart unique usefulness thereto.

In one or more embodiments, the present compositions can be particularly useful for forming elastomeric articles, and more specifically for forming condoms, gloves, finger cots, and the like. Since these types of articles are often used in settings intended to provide some degree of protection to the user, physical integrity of the article and maintenance of mechanical properties can be of great importance. For example, the ability of a condom to maintain its integrity throughout sexual intercourse is critical to its role in halting the spread of sexually transmissible pathogens and pregnancy prevention. The mechanical properties of the condom are important to ensure that the structure of the film remains intact during intercourse and also to ensure comfort for the user of the condom. Similarly, gloves made of thin films should remain intact during use to provide desired protection to the user (e.g., in a medical setting) but should also provide comfort to the user. Factors such as these, which often appear opposing (e.g., strength versus softness) can be difficult to balance and thus achieve simultaneously.

In some embodiments, tensile strength can be a useful measure of the overall strength of an elastomeric article and can be an indicator of the resistance of the article to breakage under tension. Tear strength can also be utilized as a method for measuring how well an elastomeric article can resist formation of a tear and/or resist growth of any existing tears (i.e., resistance to tear propagation) when under pressure. Modulus is measured at a specified elongation and can provide a measure of the ability of an elastomeric article to withstand changes in length when under lengthwise tension or compression. This can provide an indication of the elasticity during use, and this in turn can be a suitable indicator of a perceived softness to a consumer when wearing the article. Relaxed modulus (or relaxation modulus) describes the stress relaxation of a material with time. A measure of relaxed modulus can there be useful to determine crosslinking density of a crosslinked article. The present disclosure can provide a unique balancing of these and further properties of elastomeric articles, such as condoms, so that a consumer may have increased comfort as well as adequate protection.

Elastomeric articles according to one or more embodiments of the present disclosure preferably can be formed of one or more layers of a polymeric composition or a plurality of polymeric compositions. A composition suitable for use herein is preferably adapted to or configured to form an elastomeric film that exhibits a combination of properties as further described herein, said properties being indicative of an article that provides an appropriate balance of strength and comfort for the user of the article. Through recognition of this combination of properties, it is possible according to the present disclosure to identify suitable compositions of materials that are effective to provide the elastomeric articles with the desired properties. For example, as further described below, suitable compositions for forming one or more layers to thus achieve the elastomeric article can include a natural rubber latex, a synthetic latex, or a combination thereof. The polymer compositions likewise may include one or more additives as will be further described below.

In one or more embodiments, elastomeric articles formed from the polymer compositions preferably can be adapted to or configured to exhibit at least a minimum tensile strength and/or tear strength, exhibit a modulus that is no greater than a maximum value, and exhibit a relaxed modulus that is within a defined range. Such combination of properties thus can be effective to provide elastomeric articles exhibiting desired combinations of film strength and film softness while limiting breakage.

In example embodiments, the elastomeric articles can particularly exhibit a tensile strength that is greater than 25 MPa, greater than 28 MPa, greater than 30 MPa, or greater than 32 MPa. More particularly, article tensile strength of the elastomeric article can be in the range of about 26 MPa to about 45 MPa, about 30 MPa to about 40 MPa, or about 31 MPa to about 38 MPa. Tear strength of the elastomeric article preferably is at least 1.5 Newtons per millimeter (N/mm), at least 2 N/mm, or at least 2.2 N/mm (e.g., up to a maximum of about 20 N/mm or about 15 N/mm). In further embodiments, tear strength can be about 2 N/mm to about 20 N/mm, about 2.2 N/mm to about 15 N/mm, about 2.5 N/mm to about 12 N/mm, or about 3 N/mm to about 10 N/mm. Simultaneously, the modulus of the elastomeric article can be less than 7.0 MPa, less than 5.0 MPa, less than 4.0 MPa, or less than 3.5 MPa when measured at 500% elongation. More particularly, elastomeric article modulus can be in the range of about 1.0 MPa to about 7.0 MPa, about 1.05 MPa to about 4.0 MPa, about 1.1 MPa to about 2.5 MPa, about 1.1 MPa to about 2.25 MPa, or about 1.2 MPa to about 2.2 MPa. Elastomeric articles according to the present disclosure can exhibit an elongation at break of about 800% or greater, about 1100% or greater, or about 1200% or greater (such as in the range of about 800% to about 1,800%, about 1100% to about 1,700%, or about 1200% to about 1,600%). Relaxed modulus can be in a range of about 0.50 to about 0.61, about 0.51 to about 0.60, about 0.52 to about 0.59, about 0.53 to about 0.58, or about 0.54 to about 0.57. Relaxed modulus particularly may be measured on the polymer composition (as described below) prior to formation of the final, elastomeric article.

Tensile strength, tear strength, and tensile modulus may be measured utilizing any suitable method, such as the method provided in ASTM D412. Tear strength alternatively may be measured utilizing the method provided in ASTM D624-000. Tear strength (or tear resistance) can also be used as an indicator of appropriate strength and article integrity. More particularly, tear strength/tear resistance may be defined as the average force required to propagate a tear in the article divided by the thickness of the article. This value thus can incorporate a measured tear force, which is the average force required for the article to completely tear. Because the unique properties of elastomeric articles, such as the articles described herein, tear force may be recited as an average since the actual values (highs and lows) will vary across the total article.

The method for measuring relaxed modulus was originally published by Gorton and Pendle (Natural Rubber Technology, 1976, 7 (4), 77-81). One method for evaluating relaxed modulus can include the following steps: prepare a tube-shaped film of the latex composition (e.g., by dipping a glass tube or similar structure into the latex composition and then drying the formed film; rolling the tube shaped film to form a ring and removing the ring from the former; weighing the formed ring to find its mass (M in grams); placing the ring on the mounts of a suitable tensile tester and stretching the ring to 100% extension for one minute; measuring the load in Newtons exerted by the ring after the one minute; and using the load reading and the mass of the ring to calculate the relaxed modulus in MPa according to the following formula:

Relaxed Modulus $(MPa)=(F\times d\times C)/2M$ wherein F is the load in Newtons exerted by the ring after on minute at 100% extension, d is the density of the latex ring in grams per cubic centimeter, C is the external circumference of the dipping tube in centimeters, and M is the mass of the latex ring in grams. Preferably, relaxed modulus will be measured on a plurality of samples and the mean taken as the measured value. Such testing can be carried out, for example, using the a RRIM Relaxed Modulus Tester, Model M403, available from the Malaysian Rubber Board. Likewise, such testing may be carried out using a TA.XT Plus Texture Analyzer equipped with a 5 kilogram load cell.

In some embodiments, elastomeric articles according to the present disclosure may be characterized in relation to dynamic mechanical analysis, such as the testing described in Example 5 herein. DMA testing can be utilized to provide a Young's modulus (E') that is indicative of mechanical properties of the article when under a substantially low degree of stretch, and this can be indicative of high film quality that is analogous to strength testing that is carried out at higher degrees of stretching (e.g., tensile strength). In some embodiments, elastomeric articles according to the present disclosure may have a Young's modulus (E') that is less than 1 MPa at a frequency of 1 Hz and that is greater than 1 MPa at a frequency of 21.5 Hz. For example, the Young's modulus (E') at 1 Hz may be less than 1 MPa but greater than 0.8 MPa, and the Young's modulus (E') at 21.5 Hz may be greater than 1.05 MPa, greater than 1.1 MPa, or greater than 1.15 MPa.

Elastomeric articles configured to or adapted to exhibit structural properties having values within the above-noted ranges can be prepared from polymer compositions that are prepared using a suitable polymer composition in the form a latex (e.g., a polymer dispersion) in combination with one or more of the additives described herein. The polymer composition may be a natural rubber latex ("NRL"), a synthetic rubber latex ("SRL"), or mixtures of NRL and SRL in suitable ratios (e.g., 90/10 to 1/99 NRL to SRL, and more particularly 75/25 to 2/98, 50/50 to 3/97, 40/60 to 4/96, or 30/70 to 5/95 NRL to SRL, the foregoing ratios being weight/weight ratios). In some embodiments, the presence of an amount of a NRL can be useful to ensure that elastomeric articles prepared according to the present disclosure exhibit the necessary combination of properties. In other embodiments, a single SRL or a mixture of SRLs may be effective to form the elastomeric articles with the desired combination of properties. As such, in particular embodiments, a NRL may be expressly excluded from the present compositions and the elastomeric articles formed therefrom. Non-limiting examples of the types of SRL materials effective for preparing an elastomeric article exhibiting the desired characteristics discussed herein can include polyisoprene, poly(styrene-isoprene-styrene) ("SIS"), intermediate modulus ("IM") styrene ethylene butylene styrene ("SEBS"), high modulus ("HM") SEBS, water-based polyurethane, nitrile rubber (e.g., acrylonitrile butadiene rubber, or "NBR"), styrene-co-butadiene, styrene-co-isoprene, triblock copolymers, such as styrene-block-butadiene and block styrene (SBS), and similar, synthetic latex polymers in the form of homopolymers and/or co-polymers may be utilized. A suitable polymer may be provided in the form of a dispersion and may be used as sourced or diluted with water to a desired solids content. In particular, the polymer component(s) can be present in a sufficient amount such that the polymer composition has a total solids content of about 30% to about 65%, about 35% to about 60%, about 37% to about 57%, or about 40% to about 55%.

A polymer composition useful according to the present disclosure for forming elastomeric articles may comprise substantially only the polymer component(s). In one or more embodiments, however, a polymer composition may include one or more further components in addition to the polymer component(s). The combination of the polymer component (s) and the one or more further components can be referred to as a compounded latex composition.

For example, one or more cure accelerators may be included in the polymer composition. Suitable cure accelerators can include, for example, one or more dithiocarbamates. Non-limiting examples of suitable dithiocarbamates can include zinc dibutyldithiocarbamate (ZDBC), zinc diethydithiocarbamate (ZDEC), zinc dimethyldithiocarbamate (ZDMC), zinc dibenzyl dithiocarbamate (ZBED), sodium diethyl dithiocarbamate (SDEC), and sodium dibutyldithiocarbamate (SDBC).

In further embodiments, the polymer composition may include one or more sulfur donors. In particular, the sulfur donor may also be classified as an accelerator. In some embodiments, useful sulfur donors can include one or more thiurams, such as dipentamethylenethiuram hexasulfide (DPTTH), dipentamethylenethiuram tetrasulfide (DPTT), tetramethylthiuram monosulfide (TM™), tetramethylthiuram disulfide (TMTD), tetraethylthiuram disulfide (TETD), and tetrabenzylthiuram disulfide (TBzTD). Additionally, or alternatively, other types of sulfur donors may also be utilized. For example, 4,4'-dithiodimorpholine (DTDM), thiocarbamyl sulfonamide, and N-oxydiethylene thiocarbamyl-N-oxydiethylene sulfenamide (OTOS) may be utilized in some embodiments. The use of such materials can be beneficial in that the sulfur included in the sulfur donor compounds is not free sulfur that can contribute to potential allergies. Additionally, disulfide (S—S) bonds produced during curing (i.e., crosslinking) when using curing materials that include free/elemental sulfur are very weak and are susceptible to breakage from exposure to heat or stress. By using sulfur donors that include bulky, alkyl groups, breakage when exposed to heat or stress can be significantly reduced. The presently disclosed compositions and methods further reduce the possibility of surface bloom and also can provide significantly improved heat resistance and aging stability.

A single curing accelerator or a mixture of two or more curing accelerators may be used in the polymer composition in a total amount based upon a composition including 100 parts per hundred rubber (phr) of the polymer component or combination of polymer components. For example, in some embodiments, a single curing accelerator may be used in an amount of about 0.01 to about 5.0 phr, about 0.02 to about 4.0 phr, or about 0.5 to about 3.0 phr. In other embodiments, a single curing accelerator may be used in an amount of about 0.1 to about 5.0 phr, about 0.2 to about 4.5 phr, or about 0.4 to about 4.0 phr. In further embodiments, a total amount of all curing accelerators in the polymer composition can be about 0.2 to about 8.0 phr, about 0.4 to about 6.0 phr, or about 1.0 to about 5.0 phr.

One or more crosslinking agents may also be utilized in the polymer composition. Non-limiting examples of suitable crosslinking agents include sulfur donors, such as any source of soluble sulfur, amorphous sulfur, and derivatives thereof. Likewise, benzoyl peroxide and similar materials may be used. A single crosslinker may be used in an amount of about 0.01 to about 5.0 phr, about 0.02 to about 4.0 phr, or about 0.5 to about 3.0 phr. In further embodiments, a total amount of all crosslinker in the polymer composition can be about 0.1 to about 6.0 phr, about 0.2 to about 5.0 phr, or about 0.5 to about 4.0 phr.

A polymer composition according to the present disclosure further can comprise one or more components, such as surfactant(s), antioxidant(s), rheological stabilizer(s), filler(s), and smoothing agent(s). Suitable surfactants may be defined by a particularly useful hydrophilic/lipophilic balance (HLB) range. For example, desirable surfactants may have an HLB such that hydrophile content is limited. HLB range may be, for example, about 7 to about 24, about 7 to about 18, or about 7 to about 12. By utilizing the HLB value as a measure of suitability, a number of surfactant materials may be utilized according to the present disclosure. For example, one or more oil-in-water (O/W) emulsifiers having an HLB range as discussed above, one or more detergents having an HLB range as discussed above, one or more wetting agents having an HLB range as discussed above, and/or one or more solubilizers having an HLB range as discussed above may be utilized according to the present disclosure. In some embodiments, one or more amphoteric surfactants in particular may be included with the polymer component. For example, monosodium N-lauryl-beta-iminodipropionic acid, potassium laurate, sodium salt of sulfated methyl oleate, and sodium dodecylbenzene sulfonate (SDBS) are non-limiting examples of suitable surfactants that may be utilized. In further embodiments, one or more non-ionic surfactants may be utilized with the polymer component. For example, suitable non-ionic surfactants can include one or more block copolymers of polyethylene oxide (PEO) and polypropylene oxide (PPO), preferably wherein the PPO group is more hydrophobic than the PEO group. In an example embodiment, an A-B-A block copolymer wherein the A blocks are ethylene oxide (EO) monomers and the B blocks are propylene oxide (PO) monomers (e.g., a so-called (EO) A-(PO) B-(EO) A block copolymer).

A non-limiting example of an antioxidant that may be used is a butylated reaction product of p-cresol and dicylopentadiene that is available under the name Wingstay® L or a hindered phenol-type antioxidant available under the name Bostex 24. A non-limiting example of fillers that may be utilized includes fumed silicas or dispersions thereof, such as available under the tradename cab-o-sperse®. A non-limiting example of smoothing agents that may be utilized include proteins, such as casein. The further components present in the composition may independently be in the range of about 0.01 to about 4 phr, about 0.05 to about 3.5 phr, about 0.1 to about 3.0 phr, or about 0.2 to about 2.0 phr.

In one or more embodiments, a rheological stabilizer in particular may be included in the polymer composition. Useful rheological stabilizers can be any additive, particularly a polymer additive, that is adapted to or configured to improve film thickness uniformity without significantly adversely affecting other film properties, such as tensile strength and/or tensile modulus. Particularly useful rheological stabilizers can include one or more materials categorized as a hydrophobically modified alkali swellable emulsion ("HASE") polymer. Known HASE materials that may be utilized according to the present disclosure include materials which preferably include structural units of a) an acrylate, for example ethyl acrylate, butyl acrylate, or ethylhexyl acrylate, preferably ethyl acrylate; b) an acid, preferably acrylic acid, methacrylic acid, itaconic acid, or phosphoethyl methacrylate, preferably acrylic acid or methacrylic acid; and c) an alkylated ethoxylate monomer, preferably an alkylated ethoxylate acrylate or methacrylate. In some embodiments, useful HASE polymers include materials comprising ethyl acrylate, methacrylic acid, and hydrophobically modified (e.g., with C22 behenyl pendant groups) methacrylate with 25 moles of ethoxylation. Such materials can function synergistically with surfactants. In a non-limiting example embodiment, a suitable HASE material is available under the name Novethix™ L-10 and is an acrylates/beheneth-25 methacrylate copolymer. In one or more embodiments, a single HASE material or a total HASE material content in a polymer composition can be in the range of about 0.01 to about 1.0 phr, about 0.01 to about 0.50 phr, about 0.01 to about 0.20 phr, or about 0.02 to about 0.05 phr.

Physical properties of the elastomeric articles or films that are produced according to the present disclosure may likewise relate to the average thickness of the articles/films. The presently disclosed compositions may be particularly useful in forming relatively thin-walled structures that still exhibit the overall strength (e.g., at least a minimum tensile strength and/or tear strength) and softness (e.g., below a maximum tensile modulus) that is desired. In one or more embodiments, physical characteristics defined herein may relate to an elastomeric article having an average thickness of less than 0.1 mm, less than 0.09 mm, or less than 0.08 mm (e.g., down to a minimum thickness of about 0.01 mm). Preferably, the elastomeric articles may have a thickness of about 0.04 mm to about 0.09 mm, about 0.045 mm to about 0.085 mm, or about 0.06 mm to about 0.08 mm.

The ability to achieve the properties described herein are particularly beneficial in that it is possible to prepare articles that are effective for the desired use (e.g., provide protective characteristics, such as when used as a glove or condom) and that also exhibit good comfort qualities that can improve consistent use of the articles. In other words, the properties and associated values discussed herein are not random properties and are not values that are merely optimized over the art. Rather, the present disclosure arises from specific studies intended to identify a set of physical characteristic for thin film products that define the end product to be in a form that provides sufficient comfort to encourage routine use while simultaneously providing enhanced protection. For example, modulus and elongation at break are characteristics that are indicators of a perceived softness of the elastomeric article and also the ability of the article to be substantially form fitting (e.g., have a sufficiently snug fit to reduce unintended removal of the article while exhibiting sufficient stretch properties to enable use across a diverse population of consumers). The ability to provide good softness and form fitting enables more consistent use of an article because of improved feel against the skin of a user. As further examples, tensile strength is a characteristic that is an indicator of the ability of the article to resist tearing while stretched. Similarly, tear resistance is a characteristic that is an indicator of film toughness and thus is evidence of the article to maintain physical integrity during use. While film strength has previously been an objective for elastomeric articles, specifically seeking to combine high tensile strength and/or tear resistance with low modulus and good elongation at break have not necessarily been identified as a desired combination to achieve improved use of protective films. Moreover, since such properties can vary based upon composition as well as processing conditions, the identification of a set of physical characteristics and associated values is useful for improving the field of elastomeric articles, preparation of such materials, and use of such materials.

It is likewise beneficial that the physical properties described herein can be achieved even in the absence of one or more materials that have previously been commonly utilized in making elastomeric articles. For example, in some embodiments, the polymer composition and/or an elastomeric article formed therewith may be substantially free or completely free of any free sulfur or elemental sulfur. Substantially free may indicate that no more than a trace amount is present (e.g., less than 0.1% by weight or less than 0.01% by weight). As further discussed herein, certain composition components may be sulfur-containing materials (e.g., "sulfur donors"), but the sulfur therein is bound in a compound form. Conventional vulcanization reactions, however, typically utilize soluble sulfur (e.g., S8 rings) that are easily solubilized to provide free, elemental sulfur in the mixture to participate in crosslinking. The present compositions may be substantially free or completely free of such free sulfur or elemental sulfur. In some embodiments, the SIS latex composition and/or an elastomeric article formed therewith may be substantially free or completely free of any zinc oxide. While zinc oxide is commonly used as a cure activator in known elastomeric articles, the presently disclosed compositions advantageously can be used to form elastomeric articles without the need for utilizing such cure activator. Similarly, the SIS latex composition and/or an elastomeric article formed therewith may be substantially free or completely free of any diphenyl guanidine cure accelerator, which also is commonly used in known elastomeric articles In one or more embodiments, the present disclosure thus can provide elastomeric articles comprising one or more layers of a suitable polymer composition that is adapted to or configured to provide the elastomeric articles with the desired combination of properties. The one or more layers may be in the form of a single film, a plurality of films that are independent but at least partially adhered or otherwise bonded together, or a plurality of films that are at least partially blended together. In some embodiments, multiple films may be combined in such a manner that the films blend together (at least partially) at surfaces thereof such that a unitary, single film or layer results (i.e., a plurality of films or layers are sufficiently intimately blended together at the film or layer surfaces such that the films or layers are substantially inseparable).

In one or more embodiments, the present disclosure further provides for methods of preparing an elastomeric article. The methods may include a plurality of steps including mixing of polymer composition components, one or more steps wherein a former of other mold is dipped or otherwise coated with one or more coatings or layers of polymer composition to form a film of a desired thickness, and a curing step wherein the formed film is processed to be in a substantially finished form (e.g., crosslinked or otherwise solidified to form a unitary article of manufacture). Optionally, one or more drying steps may be utilized. Further, suitable processing equipment may be used as needed to provide for the necessary processing steps, including formers, dip tanks, heating equipment, fans, conveyers, and the like may be utilized.

In one or more embodiments, a method for preparing an elastomeric article according to the present disclosure may comprise forming a compounded latex composition including one or more polymer components and one or more further components as described herein. As a non-limiting example, the compounded latex composition can comprise at least one polymer component, at least one sulfur donor, and at least one dithiocarbamate accelerator. Optionally, one or more surfactants, one or more antioxidants, one or more fillers, and/or one or more smoothing agents may be included. The compounded latex composition may be subjected to conditions suitable for prevulcanization of the composition to a desired level of prevulcanization or crosslink density. Thereafter, a former may be dipped into the prevulcanized compounded latex composition to form at least one layer of the prevulcanized compounded latex composition thereon. In some embodiments, the former may be dipped a single time to form a single layer, or the former may be dipped twice to form two layers, or the former may be dipped three times to form three layers, or even more dipping iterations may be carried out. Where multiple dipping steps are utilized, the formed layer may be at least partially dried before carrying out the next step in the process. The layer(s) of the prevulcanized compounded latex composition may be cured to form the final elastomeric product, which them may be removed from the former using any suitable method in the field.

In some embodiments, the present method may be carried out under defined conditions that are effective to provide desired properties in the finished, elastomeric article. For example, in some embodiments, desired properties may be achieved by utilizing specific prevulcanization conditions. For example, it can be useful for prevulcanization to be carried out for maturing the composition through crosslinking. For example, maturing or prevulcanization can be carried out in a temperature range of about 25° C. to about 40° C. for a time of about 12 hours to about 48 hours. In some embodiments, the temperature for prevulcanization may be substantially steady throughout the prevulcanization time (e.g., varying in temperature by no more than 2° C. or no more than 1° C.). In some embodiments, however, the prevulcanization may be split into a plurality of temperatures for defined lengths of time. For example, prevulcanization may be carried out for a first time period at a first temperature and then for a second time period at a second, lower temperature. A first, higher temperature range may be about 32° C. to about 38° C., about 33° C. to about 37° C., or about 34° C. to about 36° C. A second, lower temperature range may be about 26° C. to about 32° C., about 27° C. to about 31° C., or about 28° C. to about 30° C. The "higher" and "lower" temperature ranges preferably are separated by at least 2° C., at least 3° C., or at least 4° C. Maturing the latex composition to achieve prevulcanization may be carried out such that the time of prevulcanization at the higher temperature is less than the time of prevulcanization at the lower temperature. For example, prevulcanization at the higher temperature may be for a time of about 0.5 hours to about 18 hours, about 1 hour to about 12 hours, or about 1.5 hours to about 8 hours. Prevulcanization at the lower temperature may be, for example, for a time of about 2 hours to about 36 hours, about 3 hours to about 30 hours, or about 8 hours to about 24 hours.

Indication that the desired level of prevulcanization has been achieved may, in some embodiments, be identified in relation to the relaxed modulus (or relaxation modulus). Preferably the prevulcanized polymer composition is subjected to prevulcanization conditions suitable to achieve a relaxed modulus within a range as otherwise described above, as such range can be an indicator that the finished, elastomeric article will exhibit the further characteristics discussed above.

In one or more embodiments, desired properties may be achieved by utilizing specific drying conditions during dipping. In certain embodiments, it can be desirable for drying to be carried out after a dipping step, prior to a further dipping step and/or prior to curing. Drying may be carried out in a temperature range of about 80° C. to about 120° C. or about 85° C. to about 115° C. Drying in this temperature range can be for a time of about 1 minute to about 10 minutes, about 2 minutes to about 8 minutes, or about 3 minutes to about 7 minutes. In some embodiments, two dipping steps, three dipping steps, or even more dipping steps can be utilized, and drying after the respective dipping steps can be at different temperatures. For example, drying after a first dipping step can be at a temperature that is lower than the temperature of a second dipping step. A first, lower temperature range may be about 80° C. to about 100° C., about 85° C. to about 95° C., or about 88° C. to about 92° C. A second, higher temperature range may be about 100° C. to about 120° C., about 105° C. to about 115° C., or about 108° C. to about 112° C. The "higher" and "lower" temperature ranges preferably are separated by at least 2° C., at least 3° C., or at least 4° C. Temperatures for drying after further dipping steps can be similar to either of the first and second temperature ranges provided above.

Although a variety of physical characteristics are described herein for defining the properties of an elastomeric article, it is understood that the present disclosure fully encompasses any combination of two or more of the described properties, three or more of the described properties, or all of the described properties. Likewise, the elastomeric article can be prepared to meet the various ranges for the properties described above.

EXPERIMENTAL

The present disclosure is more fully illustrated by the following examples, which are set forth to illustrate certain embodiments of the present disclosure and are not to be construed as limiting thereof.

EXAMPLE 1—Evaluation of Article Strength and Softness

Condoms were prepared using IM SEBS and HM SEBS. The IM SEBS composition was prepared using Sylvaros™ DRS-42 Surfactant at 11.1% w/w, Kraton G1651 SEBS polymer at 15.3% w/w, Kraton G1650 SEBS polymer at 22.9% w/w, and Hydrobrite® HV mineral oil at 50.7% w/w. The HM SEBS 104 composition was prepared using Sylvaros™ DRS-42 Surfactant at 11.1% w/w, Kraton G1652 SEBS polymer at 5.8% w/w, Kraton G1651 SEBS polymer at 23.3% w/w, Kraton G1650 SEBS polymer at 27.7% w/w, and Hydrobrite® HV mineral oil at 32.1% w/w. The HM SEBS 114 composition was prepared using Sylvaros™ DRS-42 Surfactant at 11.1% w/w, Kraton G1652 SEBS polymer at 11.8% w/w, Kraton G1651 SEBS polymer at 35.5% w/w, Kraton G1650 SEBS polymer at 18.4% w/w, and Hydrobrite® HV mineral oil at 23.1% w/w.

Quantitative tensile and modulus data were examined against a qualitative sensory study with observed breakage recorded during the course of use. Additionally, the IM SEBS polymer articles and HM SEBS polymer articles were compared for tensile strength, modulus at 500% elongation, and breakage. The observed properties are shown in Table 1. Low tensile strength (i.e., <22 MPa) combined with a low modulus was observed to have a higher reported breakage by panelists within the qualitative study conducted. The modulus was examined for qualitative sensory differences between IM SEBS and HM SEBS samples. When the modulus was lowered the samples were found to be perceived significantly softer (P<0.05) by panelists within the study, as shown in Table 2. In the panel review, four sets of each material (A and B) were evaluated by 32 panelists for a total of 128 total choices. The number of times a respective sample was chosen by a panelist are shown in the columns entitled "Sample A softer" and "Sample B softer." Such perceived softness is believed to be effective to provide increased comfort for the end user of the product. The unique balance of the tensile strength and modulus as observed in the data set at the ranges detailed provide film integrity while maintaining the stretchable nature of the film (which can likewise be perceived as softness) and limited observation of breakage by panelists. Furthermore, the reduction in modulus while maintaining a substantially high tensile strength (e.g., >22 MPa) was found to increase the perceived softness while maintaining the film integrity as observed by lower breakage, as detailed above.

TABLE 1

Evaluation of Tensile Strength, Modulus, and Breakage During Use

| Composition | Tensile (MPa) | Modulus (MPa) @ 500% | Breakage Incidence During Use |
|---|---|---|---|
| IM SEBS | 5.65 | 1.96 | 14-21% |
| HM SEBS 104 | 22.42 | 5.19 | 9% |
| HM SEBS 114 | 25.84 | 6.92 | 6% |

TABLE 2

Effect of Modulus on Perceived Softness

| Sample A | Modulus A (MPa) | Sample B | Modulus B (MPa) | Sample A softer | Sample B softer | P value |
|---|---|---|---|---|---|---|
| IM SEBS | 1.96 | HM SEBS 104 | 5.19 | 97 | 31 | <0.001 |
| IM SEBS | 1.96 | HM SEBS 114 | 6.92 | 89 | 39 | <0.001 |
| HM SEBS 104 | 5.19 | HM SEBS114 | 6.92 | 80 | 48 | 0.01 |

EXAMPLE 2—Control of Physical Characteristics Through Compositional Changes

Synthetic SIS latex compositions and elastomeric latex articles were prepared for evaluation of the physical characteristics thereof. To prepare the compositions, an aqueous poly(styrene-isoprene-styrene) latex composition having a solid content of 65% was obtained from Kraton Polymers and was diluted to approximately 50% solid content using deionized water. Surfactant(s) and cure accelerator(s) were added to the latex mixture and stirred about 100 to 150 rpm at room temperature overnight. The compounded latex was filtered using a 200 μm filter and left in a dip tank overnight to remove air bubbles. Antioxidant(s) were added to the composition approximately two hours prior to starting of dipping.

To prepare the elastomeric articles, two dipping actions were performed for the particular composition tested. A first dip in the dip tank was carried out at a withdrawal speed of about 0.2 to 0.4 inches per second to obtain the desired film thickness and oven dried at about 90° C. for about 5 minutes. A second dip in the dip tank was carried out at a withdrawal speed of about 0.2 to 0.4 inches per second to obtain the desired film thickness and oven dried at about 90° C. for about 5 minutes. The final film was oven cured at about 120° C. for about 15 minutes. The formed elastomeric latex article was removed from the former using a corn starch slurry and air dried.

The compositions used to form the elastomeric articles utilized varying accelerator components and amounts as seen in Tables 3-5 below. Tensile properties for the different articles are also shown.

TABLE 3

| Formulation (in phr) | | Control | Accelerator (1.3 phr) | Accelerator (1.5 phr) | Accelerator (1.7 phr) |
|---|---|---|---|---|---|
| Latex | SIS | 100 | 100 | 100 | 100 |
| Surfactant | Manawet™ 172 | 0.5 | 0.5 | 0.5 | 0.5 |
| Cure Agent | Sulfur | 0 | 0 | 0 | 0 |
| Cure Activator | Zinc Oxide | 0 | 0 | 0 | 0 |
| Cure Accelerator | ZDEC (Bostex 561) | 0 | 0.52 | 0.6 | 0.68 |
| | DPTTH (Bostex 224) | 0 | 0.78 | 0.9 | 1.02 |
| Antioxidant | Wingstay® L | 0.5 | 0.5 | 0.5 | 0.5 |
| Tensile Properties | Tensile (MPa) | 19.42 | 24.9 | 28 | 25.4 |
| | Modulus @500% (MPa) | 1.04 | 1.52 | 1.59 | 1.75 |
| | Elongation (%) | 1419 | 1335 | 1358 | 1288 |

TABLE 4

| Formulation (in phr) | | Accelerator (2.0 phr) | Accelerator (2.5 phr) | Accelerator (3.0 phr) | Accelerator (4.0 phr) |
|---|---|---|---|---|---|
| Latex | SIS | 100 | 100 | 100 | 100 |
| Surfactant | Manawet™ 172 | 0.5 | 0.5 | 0.5 | 0.5 |
| Cure Agent | Sulfur | 0 | 0 | 0 | 0 |
| Cure Activator | Zinc Oxide | 0 | 0 | 0 | 0 |
| Cure Accelerator | ZDEC (Bostex 561) | 0.8 | 1.0 | 1.2 | 1.5 |
| | DPTTH (Bostex 224) | 1.2 | 1.5 | 1.8 | 2.5 |
| Antioxidant | Wingstay® L | 0.5 | 0.5 | 0.5 | 0.5 |
| Tensile Properties | Tensile (MPa) | 28.2 | 26 | 29.8 | 21.95 |
| | Modulus @500% (MPa) | 1.93 | 2.3 | 2.7 | 3.27 |
| | Elongation (%) | 1300 | 1233 | 1181 | 1079 |

TABLE 5

| Formulation (in phr) | | Control | Bostex 561/224 | Bostex 909 |
|---|---|---|---|---|
| Latex | SIS | 100 | 100 | 100 |
| Surfactant | Manawet™ 172 | 0.5 | 0.5 | 0.5 |
| Cure Agent | Sulfur | 0 | 0 | 0 |
| Cure Activator | Zinc Oxide | 0 | 0 | 0 |
| Cure Accelerator | ZDEC (Bostex 561) | 0 | 0.6 | 0 |
| | DPTTH (Bostex 224) | 0 | 0.9 | 0 |
| | ZDEC + DPTT (Bostex 909) | 0 | 0 | 1.5 |
| Antioxidant | Wingstay® L | 0.5 | 0.5 | 0.5 |
| Tensile Properties | Tensile (MPa) | 19.42 | 28 | 26.4 |
| | Modulus@500% (MPa) | 1.04 | 1.59 | 1.7 |
| | Elongation (%) | 1419 | 1358 | 1273 |

EXAMPLE 3—Effect of Cure Agent and Cure Activator on Physical Properties of Elastomeric Latex Articles Latex compositions and elastomeric latex articles were prepared using the methods described above in Example 2 with and without the use of sulfur cure agent and zinc oxide cure activator to evaluate the effect on tensile properties. The formulations and testing results are shown in Table 6 below. As seen therein, the presence of sulfur and zinc oxide tended to increase the tensile modulus while also decreasing the tensile strength. This result therefore is surprising in that, in conventional latex compositions (e.g., natural rubber and/or synthetic polyisoprene), sulfur and zinc oxide are used to increase crosslinking in order to improve tensile strength. The present testing, however, showed that it is possible to achieve suitable tensile properties while excluding sulfur and zinc oxide and thus being substantially free or completely free of Type I and Type IV allergens.

TABLE 6

| Formulation (in phr) | | Control | Without Sulfur/ ZnO | With Sulfur/ ZnO | With Sulfur/ ZnO |
|---|---|---|---|---|---|
| Latex | SIS | 100 | 100 | 100 | 100 |
| Surfactant | Manawet ™ 172 | 0.5 | 0.5 | 0.5 | 0.5 |
| Cure Agent | Sulfur | 0 | 0 | 0.5 | 0.5 |
| Cure Activator | Zinc Oxide | 0 | 0 | 0.5 | 0.5 |
| Cure Accelerator | ZDEC (Bostex 561) | 0 | 0.6 | 0.6 | 1.2 |
| | DPTTH (Bostex 224) | 0 | 0.9 | 0.9 | 1.8 |
| Antioxidant | Wingstay ® L | 0.5 | 0.5 | 0.5 | 0.5 |
| Tensile Properties | Tensile (MPa) | 19.42 | 28 | 25.63 | 29.8 |
| | Modulus @500% (MPa) | 1.04 | 1.59 | 2.33 | 2.7 |
| | Elongation (%) | 1419 | 1358 | 1267 | 1181 |

EXAMPLE 4—Effect of Processing on Properties of the Formed, Elastomeric Articles Condoms were prepared from compounded SIS latex compositions using varying prevulcanization and drying conditions. The formed condoms were then subjected to tensile strength testing and tensile modulus testing. The compounded SIS latex composition is shown in Table 7. The condom forming parameters and the measured properties of the formed condoms are provided in Table 8.

TABLE 7

| Component | Concentration (phr) |
|---|---|
| SIS polymer latex dispersion | 100 |
| Amphoteric surfactant | 0.5 |
| Sulfur donor | 0.9 |
| Accelerator | 0.6 |
| Antioxidant | 0.5 |

TABLE 8

| | Run 1 | Run 2 | Run 3 | Run 4 | Run 5 |
|---|---|---|---|---|---|
| Pre-Vulc. Conditions | 35° C. for 3 hrs/ 29° C. for 18 hrs | 35° C. for 6 hrs/ 29° C. for 18 hrs | 29° C. for 23 hrs | 35° C. for 17 hrs/ 29° C. for 23 hrs | 35° C. for 3 hrs/ 29° C. for 18 hrs |
| Dry 1/ Dry 2 Conditions | 90° C. for 5 min/ 100° C. for 5 min | 90° C. for 5 min/ 100° C. for 5 min | 90° C. for 5 min/ 110° C. for 5 min | 90° C. for 5 min/ 100° C. for 5 min | 90° C. for 5 min/ 110° C. for 5 min |
| Tensile Strength (MPa) | 15.9 | 17.04 | 20.4 | 20.4 | 24.5 |
| Modulus at 500% (MPa) | 1.31 | 1.24 | 1.28 | 1.13 | 1.22 |
| Load at 500% (N) | 4.3 | 4 | 4.5 | 3.9 | 3.9 |
| Elongation (%) | 1260 | 1270 | 1290 | 1290 | 1310 |

TABLE 8-continued

| | Run 1 | Run 2 | Run 3 | Run 4 | Run 5 |
|---|---|---|---|---|---|
| Relaxed Modulus | 0.56 | 0.68 | 0.70 | 0.65 | 0.56 |

Test sample 5 was also evaluated for tear strength using ASTM D624-000. Testing indicated that the sample exhibited a tear strength of 2.23 N/mm.

EXAMPLE 5—Dynamic Mechanical Analysis

Test samples were prepared using a composition comprising 100 phr SIS polymer latex dispersion, 0.5 phr amphoteric surfactant, 0.9 phr sulfur donor, 0.6 phr accelerator, and 0.5 phr antioxidant. Prevulcanization was carried out at 35° C. for a time of 3 hours or 6 hours. Articles were prepared by dipping the former into the SIS polymer formulation for two iterations. Drying after the first dipping was carried out for 5 minutes at 90° C., and drying after the second dipping was carried out for 5 minutes at 110° C. Dynamic mechanical analysis (DMA) was carried out on the formed articles to measure the properties of the solid articles in a manner analogous to rheology testing for liquid compositions. Young's modulus (E) was measured as an indication of the stiffness of the material as the material was stretched. Young's modulus (E) is defined as the ratio of the stress σ (force/area) to the strain ε (degree of deformation), wherein $E=\sigma/\varepsilon$. The modulus (E) can be defined by a complex expression involving storage modulus (E') and a loss modulus (E") as seen below, wherein $i=(-1)^{1/2}$ (i.e., negative to the ½ power), and E* is a representation of a vector quantity in the complex space, and derives from the oscillatory nature of the stress and strain.

$$E^*=E'+iE''$$

$$E=|E^*|$$

Figure 1:
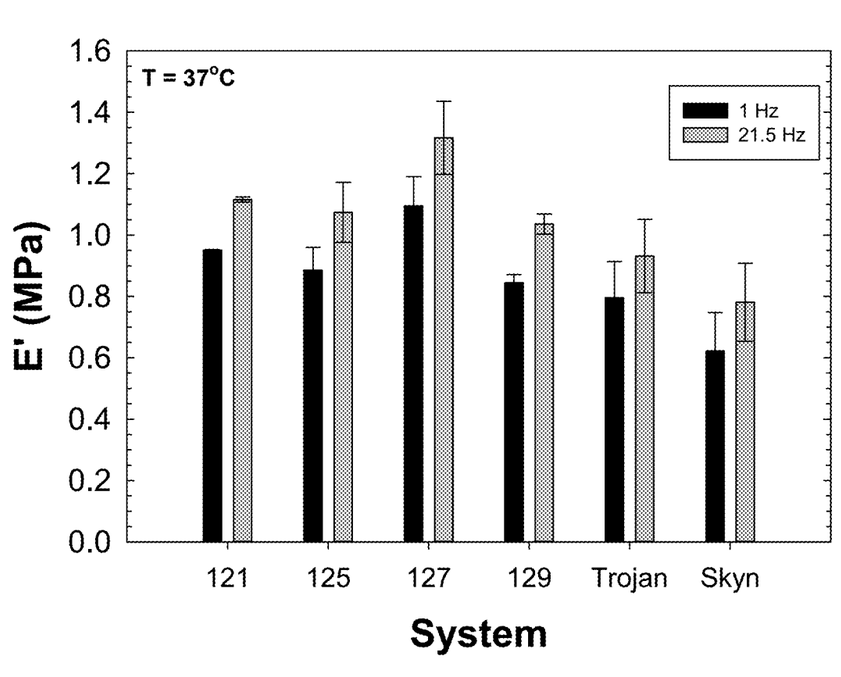
FIG. 1 is a graph showing Young's modulus (E') values for various elastomeric articles according to the present disclosure compared with known elastomeric articles.

In DMA studies, samples were cut from the above-noted articles perpendicular to the long axis. The resulting ring was then folded to produce a sample 8 layers thick, and the sample was mounted in the DMA using the tensile apparatus. Dimensions were typically on the order of 9.5 cm long, 7.5 mm long, and 0.55 mm thick. All studies were run on a Triton Tritec 2000 DMA. Frequency dependent studies were performed in the frequency range of 0.1 to 75 Hz, using a displacement of 0.1 mm. Run temperatures at 25° C. and 37° C. were regulated by an electric furnace enclosing the sample holder. Runs at 25° C. were essentially at the ambient temperature of the laboratory. Temperature scans were performed by first cooling the sample with liquid nitrogen to a temperature of approximately −80° C. The furnace was then used to increase the temperature at a rate of 5° C./minute, up to a maximum temperature of 40° C. As in the frequency scans, a displacement of 0.1 mm was used, and the frequency was held constant at 1.0 Hz. In addition to the above, comparative samples were tested and were taken from commercial products sold under the tradenames Skyn® (formed of polyisoprene) and Trojan® Enz (formed of natural rubber). Plots of moduli E' versus frequency indicated that all tested samples prepared according to the present disclosure exhibited moduli that were greater than moduli of the comparative samples. The test results are illustrated in FIG. 1, and the DMA E' data are particularly useful for illustrating improved film properties when the film is at a relatively low degree of extension.

Use of the words "about" and "substantially" herein are understood to mean that values that are listed as "about" a certain value or "substantially" a certain value may vary by an industry recognized tolerance level for the specified value. When an industry recognized tolerance is unavailable, it is understood that such terminology may indicate that an acceptable value may be vary +3%, +2%, or #1% from the specifically listed value. More particularly, where a temperature is disclosed, "about" or "substantially" may indicate the specifically listed temperature +2° C., +1° C., or +0.5° C. Likewise, in some embodiments, the listed value may be exact, if desired, and variations above or below the listed value may be expressly excluded.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An elastomeric article prepared according to a method comprising:
preparing a compounded latex composition including a synthetic rubber latex polymer, at least one sulfur donor, at least one amphoteric surfactant, and at least one dithiocarbamate accelerator, wherein the synthetic rubber latex polymer is poly(styrene-isoprene-styrene);
prevulcanizing the compounded latex composition to form a prevulcanized compounded latex composition, said prevulcanizing being carried out for a first time period at a first temperature and then for a second time period at a second, lower temperature, the prevulcanizing being effective to achieve a relaxed modulus of about 0.50 to about 0.61;
dipping a former into the prevulcanized compounded latex composition to form at least one layer of the prevulcanized compounded latex composition thereon; and
curing the at least one layer of the prevulcanized compounded latex composition on the former to provide the elastomeric article;
wherein the elastomeric article is a condom; and
wherein the elastomeric article at a thickness of about 0.1 mm or less exhibits a tensile strength of greater than 28 MPa when measured in accordance with ASTM D412, exhibits a tear strength of greater than 2 N/mm where measured in accordance with ASTM D412 or ASTM D624, exhibits a tensile modulus at 500% elongation of about 1.1 MPa to about 2.5 MPa when measured in accordance with ASTM D412, exhibits an elongation at break of about 1,100% or greater, and exhibits a Young's modulus (E') that is less than 1 MPa at a frequency of 1 Hz and that is greater than 1 MPa at a frequency of 21.5 Hz.

2. An elastomeric article comprising one or more layers of a polymer composition formed from a synthetic rubber latex selected from the group consisting of styrene ethylene butylene styrene, water-based polyurethane, nitrile rubber, and combinations thereof, wherein the elastomeric article at a thickness of about 0.1 mm or less exhibits a tensile strength of greater than 30 MPa when measured in accordance with ASTM D412, exhibits a tear strength of greater than 2 N/mm where measured in accordance with ASTM D412 or ASTM D624, exhibits a tensile modulus at 500% elongation of about 1.1 MPa to about 2.5 MPa when measured in accordance with ASTM D412, and exhibits an elongation at break of about 1,100% or greater.

3. The elastomeric article of claim 1, wherein the at least one sulfur donor is a thiuram compound.

4. The elastomeric article of claim 1, wherein the at least one sulfur donor includes one or both of dipentamethylenethiuram tetrasulfide (DPTT) and dipentamethylenethiuram hexasulfide (DPTTH).

5. The elastomeric article of claim 1, wherein the compounded latex composition further includes at least one antioxidant.

6. The elastomeric article of claim 1, wherein the first temperature is in a range of about 32° C. to about 38° C.

7. The elastomeric article of claim 1, wherein the second temperature is in a range of about 26° C. to about 32° C.

8. The elastomeric article of claim 1, wherein the first temperature and the second temperature are separated by at least 2° C.

9. The elastomeric article of claim 1, wherein the first time period is about 0.5 hours to about 18 hours.

10. The elastomeric article of claim 1, wherein the second time period is about 2 hours to about 36 hours.

* * * * *